March 10, 1970   R. G. ELLIS   3,499,687
APPARATUS FOR FEEDING FRUIT TO A CONVEYOR FROM A BULK SUPPLY
Filed Nov. 5, 1968   7 Sheets-Sheet 1

INVENTOR.
ROBERT G. ELLIS
BY
ATTORNEYS

March 10, 1970            R. G. ELLIS            3,499,687

APPARATUS FOR FEEDING FRUIT TO A CONVEYOR FROM A BULK SUPPLY

Filed Nov. 5, 1968            7 Sheets-Sheet 3

INVENTOR.
ROBERT G. ELLIS

BY        ATTORNEYS

INVENTOR.
ROBERT G. ELLIS

BY
ATTORNEYS

March 10, 1970  R. G. ELLIS  3,499,687
APPARATUS FOR FEEDING FRUIT TO A CONVEYOR FROM A BULK SUPPLY
Filed Nov. 5, 1968  7 Sheets-Sheet 5

INVENTOR.
ROBERT G. ELLIS
BY Eckhoff and Hoppe
ATTORNEYS

March 10, 1970  R. G. ELLIS  3,499,687
APPARATUS FOR FEEDING FRUIT TO A CONVEYOR FROM A BULK SUPPLY
Filed Nov. 5, 1968  7 Sheets-Sheet 6

INVENTOR.
ROBERT G. ELLIS
BY Eckhoff and Hoppe
ATTORNEYS

INVENTOR.
ROBERT G. ELLIS
BY
Eckhoff and Hoppe
ATTORNEYS

United States Patent Office 3,499,687
Patented Mar. 10, 1970

3,499,687
APPARATUS FOR FEEDING FRUIT TO A
CONVEYOR FROM A BULK SUPPLY
Robert G. Ellis, Richmond, Calif., assignor to Atlas
Pacific Engineering Company, a corporation of
Delaware
Continuation-in-part of abandoned application Ser. No.
626,794, Mar. 29, 1967. This application Nov. 5, 1968,
Ser. No. 777,982
Int. Cl. B65g 53/00
U.S. Cl. 302—14                              9 Claims

ABSTRACT OF THE DISCLOSURE

Apparatus for feeding fruit from a bulk supply into a pickup station and wherein pieces of fruit are floated in a continuous trough and recirculated in the trough until they are picked up by a conveyor.

Apparatus for feeding fruit from a bulk supply into a pickup station comprising a trough for holding liquid in which pieces of fruit may be made to float; means separating the trough to provide a continuous track including a pair of fluidly connected legs, one leg being adapted to receive fruit in bulk; a conveyor extending along a side portion of the other leg of said trough and having a series of spaced pockets for receiving a piece of fruit at a pickup station within said trough as a pocket is moved through said pickup station; a pump means for discharging liquid under pressure into said trough to produce a continuous circulation of liquid through the legs of said trough; and means fluidly communicating the low pressure side of said pump means with an opening into said trough, said opening being located in a region of said pickup station for withdrawing liquid and producing a movement of fruit into the pickup station.

---

This application is a continuation-in-part of application Ser. No. 626,794, filed Mar. 29, 1967, now abandoned.

This invention relates to the use of liquid as a carrier for feeding fruit from a bulk supply to a station where the pieces of fruit may be picked up one piece at a time by a conveyor.

One of the most conventional systems for transporting and separating fruit from a bulk supply employs a series of belts that move in opposite directions. This type of apparatus tends to bruise the fruit while it is being transported. However, this problem is overcome by apparatus comprising a liquid conveyor or flumes for transporting pieces of fruit from a bulk supply to a pickup station where the fruit is lifted from the conveying liquid. The present invention is primarily concerned with the last-mentioned type of aparatus but differs therefrom in providing various novel features whereby a bulk supply of fruit is continuously moved past a conveyor and recirculated until it is received in a pickup station, a single piece of fruit being separated from the bulk supply, received in the pickup station and then lifted by the conveyor for further processing.

In general, this invention provides an elongated trough for moving and recirculating fruit as it is carried by liquid around a partition that divides the trough into essentially parallel legs. At least one conveyor is provided along one leg of the trough, a portion of the conveyor extending into the trough for receiving a single piece of fruit at a pickup station. The movement of fruit into the pickup station is accomplished in a positive fashion by various devices including a moving current of liquid. This current is developed by withdrawing liquid through an exhaust port in the region of the pickup station, said port being connected to the low pressure side of a pump means that discharges liquid back into the trough for producing a continuous circulation of the liquid and conveyed fruit.

One object of this invention is to provide an apparatus for separating pieces of fruit from a bulk supply without causing a bruising of the fruit.

Another object is to provide apparatus of the kind described which will feed either large or small pieces of fruit, or fruit of mixed sizes, into a pickup station of a conveyor and wherein a single piece of fruit will be separated out from a bulk supply and transported by the conveyor.

Another object of the invention is to provide apparatus of the kind described for feeding pieces of fruit from a bulk supply into a pickup station of a conveyor, the fruit being transferred onto the conveyor with great efficiency, e.g. without significant misses in pickups.

Various other objects of this invention will become apparent in view of the following detailed description and the accompanying drawings.

In the drawings forming a part of this application and in which like parts are identified by like reference numerals throughout the same, FIG. 1 is a plan view of a feeder embodying this invention;

DESCRIPTION OF THE PREFERRED EMBODIMENTS

Figure 1:
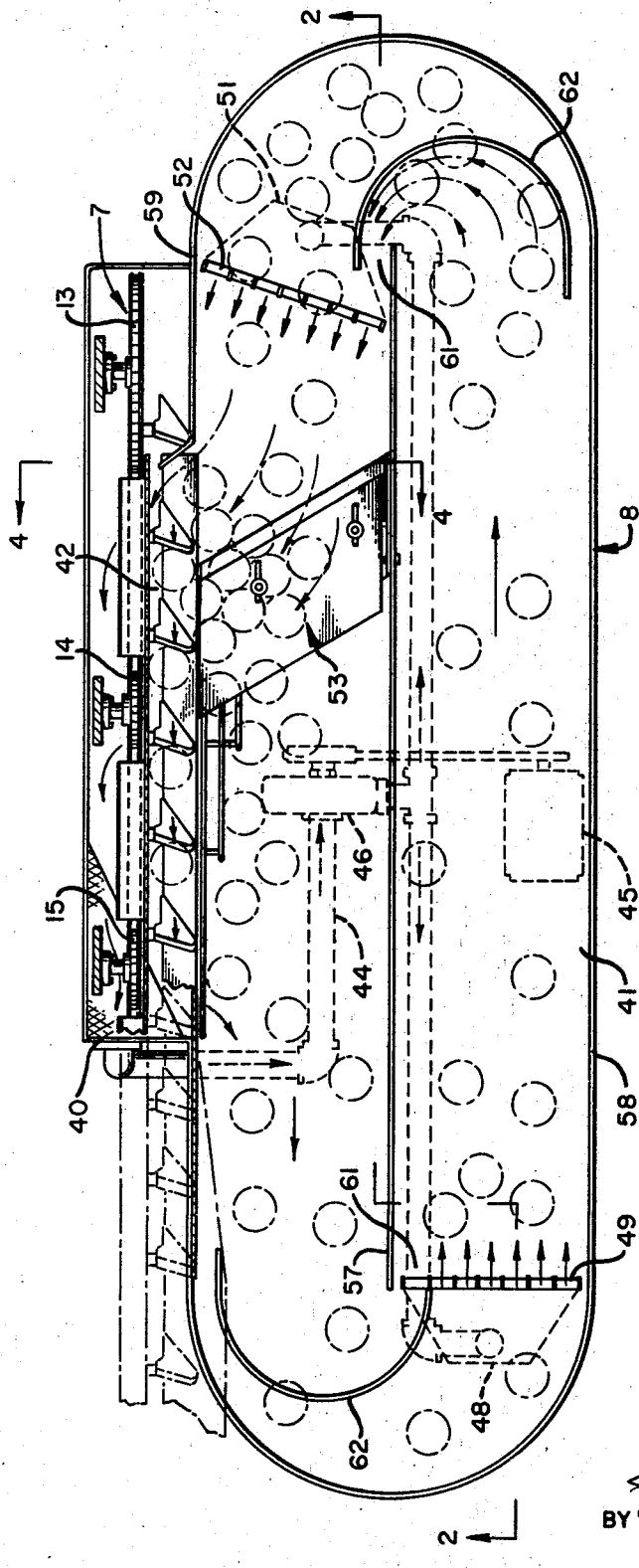

The feeding device of this invention includes a suitable frame, generally indicated at 6, and which serves to support a chain conveyor structure, generally indicated at 7, and a liquid containing trough or flume, generally indicated at 8, and which contains a suitable liquid, generally indicated at 9. Briefly, fruit in bulk is placed in the trough 8 at region 41 while the liquid in the trough is suitably moved to deliver the fruit to the conveyor 7.

The conveyor 7 includes a suitable chain 11 trained about sprockets 12 and 13 at each end and supported or guided by intermediate sprockets 14, 15, 16 and 17. Sprockets 12 and 13 are carried on shafts 26 and 27 which are suitably journalled in the frame. The idler sprockets 14, 15, 16 and 17 are also suitably mounted upon shafts 28, 29, 31 and 32 which are also suitably journalled on the frame. Drive for the conveyor is provided by means, not shown, which drives the sprocket 12.

Figure 2:
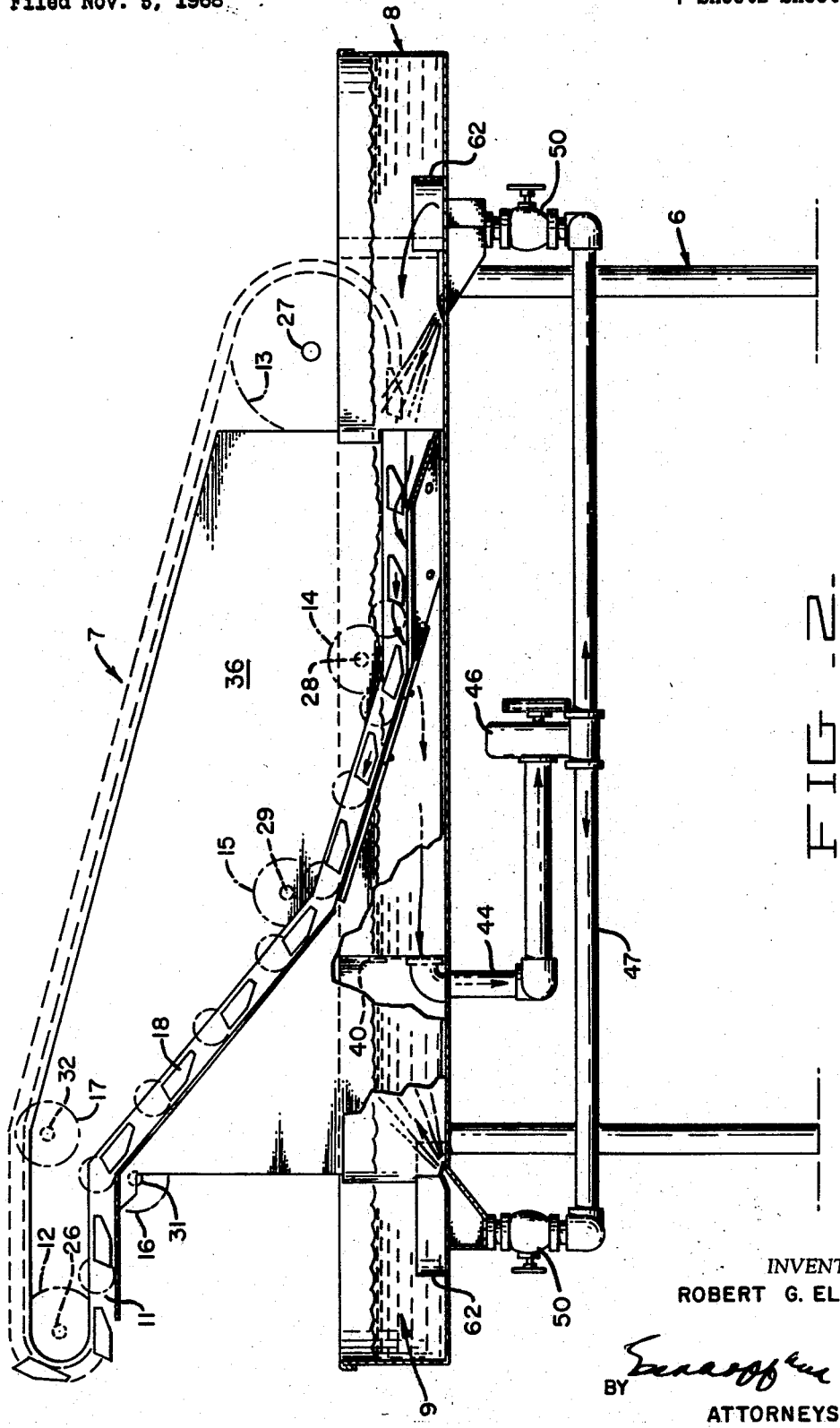
FIG. 2 is a side elevation of the feeding mechanism taken along the line 2—2 of FIG. 1.

Between sprockets 13 and 14, the conveyor moves in a generally horizontal direction to the left in FIGS. 1 and 2 while from sprocket 14 to 15, the conveyor moves upwardly at a small gentle angle to the horizontal while between sprockets 15 and 16, the conveyor rises at a steeper angle.

Figure 3:
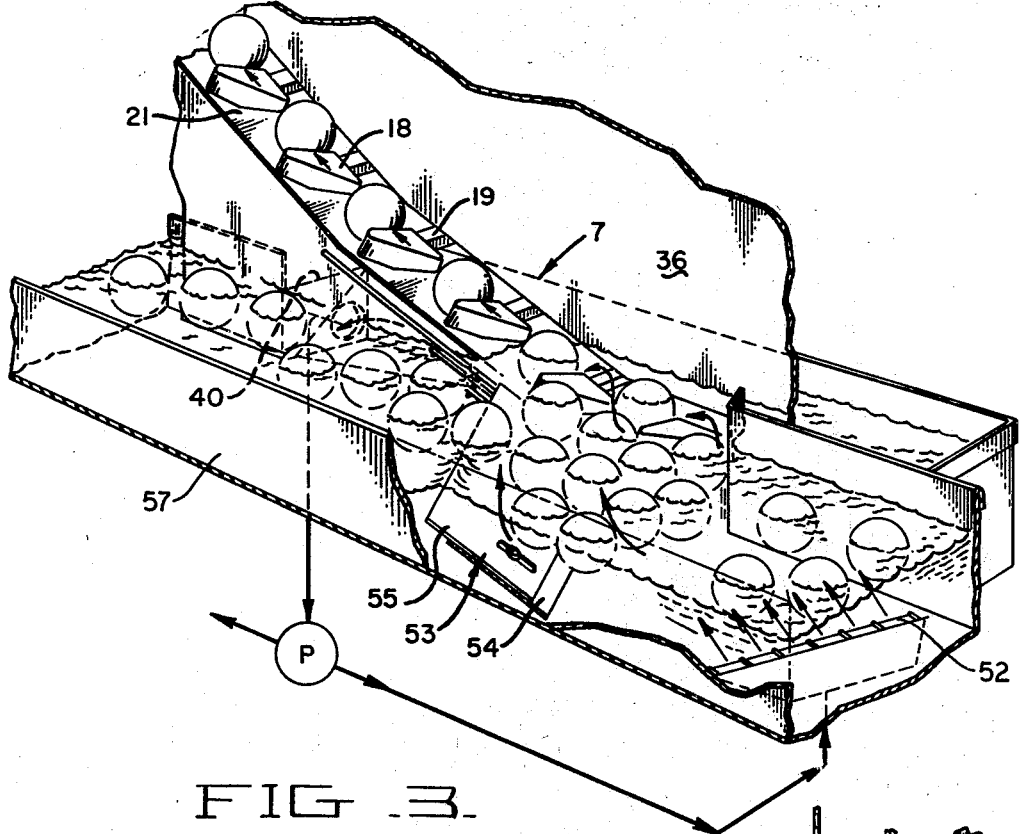
FIG. 3 is fragmentary perspective view showing the manner in which the fruit is urged into the pockets of the chain conveyor.
Figure 4:
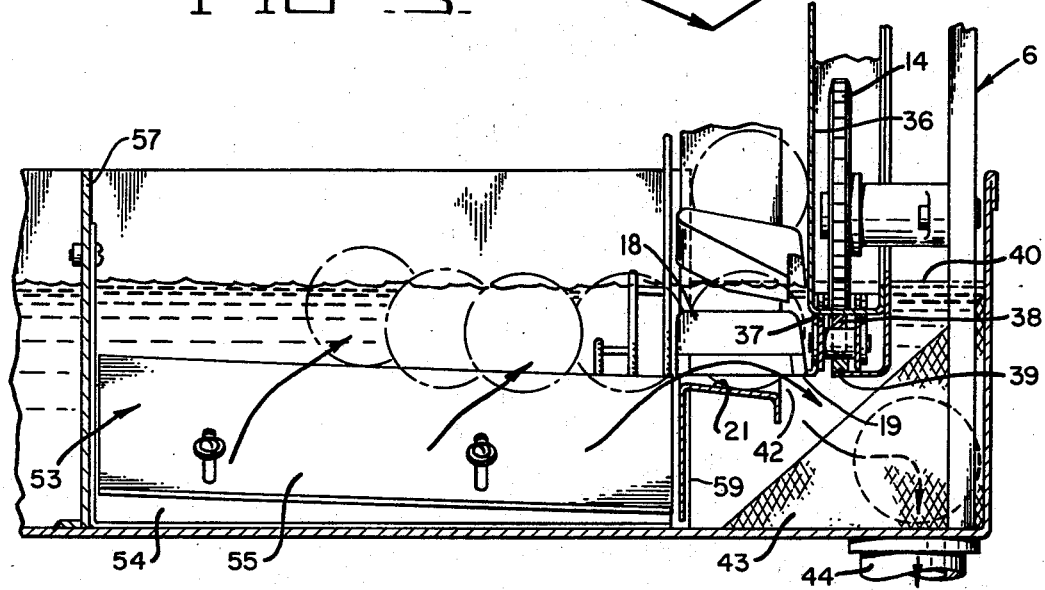
FIG. 4 is a cross section through the liquid conveyor and feeder conveyor along the line 4—4 of FIG. 1.

Conveyor 7 has a vertical side wall 36 (FIGS. 3 and 4) suitably supported on frame 6. The side wall is formed with a horizontal portion 37 on which is mounted the chain guide 38 while a chain support rail 39 is provided beneath the chain.

Secured at spaced intervals to the chain 11 are fruit carrier lugs 18. Each lug is attached as by an arm 19 to a link in the chain. Each lug is of a generally triangular shape and that side of the lug providing the forward or leading face is at an angle to the conveyor so that the leading face extends outwardly away from the conveyor and forwardly to provide an effective pocket for the fruit. The height of each lug is such that it will retain a single large fruit but the uppermost of the two small fruits will not be retained. Thus, two small apples start up the steep run of the conveyor as from sprocket 15 to sprocket 16, the height of each lug 18 is such that the uppermost second fruit will roll back and will not be transported.

The lugs are moved over a shelf 21 which extends from the point of initial admission of the fruit to the conveyor up along the run of the conveyor to the discharge station at sprocket 12. The width of shelf 21 in the horizontal and gentle rise portion of the conveyor is sufficient to support the largest fruit yet not wide enough to support two small fruits in a side-by-side relationship. Additionally, the shelf is provided at a slight angle to the horizontal as appears in FIG. 4 so that with the lug it provides a pocket into which a properly seated fruit readily remains while a second fruit will be rejected. Thus, should more than one piece of fruit be received in a pocket, all but the first will fall back down the conveyor or be discharged laterally from shelf 21.

Further, the leading face of lugs 18 are inclined backwards slightly to provide a lifting force and to assist in sliding and rolling the fruit along the shelf.

Fruit is supplied to conveyor 7 by the continuous circulation of the liquid in trough 8. The liquid is induced to circulate in an endless path between divider 57 and outer walls 58 and 59 by a pumping system and a series of jets. A portion of the liquid in the trough is withdrawn through screen 43 into pipe 44 (FIG. 4) leading to the suction of pump 46 which is driven by motor 45. The outlet flow of the pump is distributed by pipe 47 to manifolds 48 and 51 which terminate in a series of slotted jets 49 and 52, each jet extending substantially across the full width between adjacent walls. The slotted jets are directed to discharge liquid at an angle upwards toward the surface of the liquid, thereby urging the liquid and the floating fruit to move in the direction of the flow from the jets. Suitable valves 50 are provided in pipe 47 so that the velocity of flow can be adjusted to substantially match the velocity of chain 11. The placement of fruit into spaces between lugs 18 of conveyor 7 is assisted by causing the liquid to flow over shelf 21 through a slot 42. In addition, jets 52 are angled to discharge liquid toward the fruit receiving portion of conveyor 7 while maintaining the depth of the liquid to float the largest fruit clear of the bottom, yet not of such depth that the bulk of liquid will flow beneath the applies without carrying the fruit along. The depth of the liquid is limited by the overflow gate 40 which is adjustable in height.

Further, to urge the fruit into the conveyor pockets, a baffle plate, generally indicated at 53, is provided. The baffle is angled across the flow in a direction to urge the fruit and liquid toward conveyor 7. Baffle plate 53 includes a lower plate 54 secured to the walls and bottom of the channel and an upper adjustable plate 55 which is positioned to require all the liquid flowing in the channel to pass either over the crest of the baffle into the following portion of the trough or over shelf 21 and thence to the pump. The fruit carried in the liquid upon touching the upper adjustable plate 55 of the baffle is urged toward the chain pockets while the bulk of the liquid can continue over the crest. The plate 55 may be adjusted to suit the general size of the apples being run, but in any event, plate 55 should not be lower than shelf 21. The liquid level may be raised or lowered by adjusting the overflow 40 to accomplish the adjustment for fruit size. Any fruit which cannot find accommodation in a pocket passes over the top of the baffle with the bulk of the liquid and is then recirculated.

Figure 7:
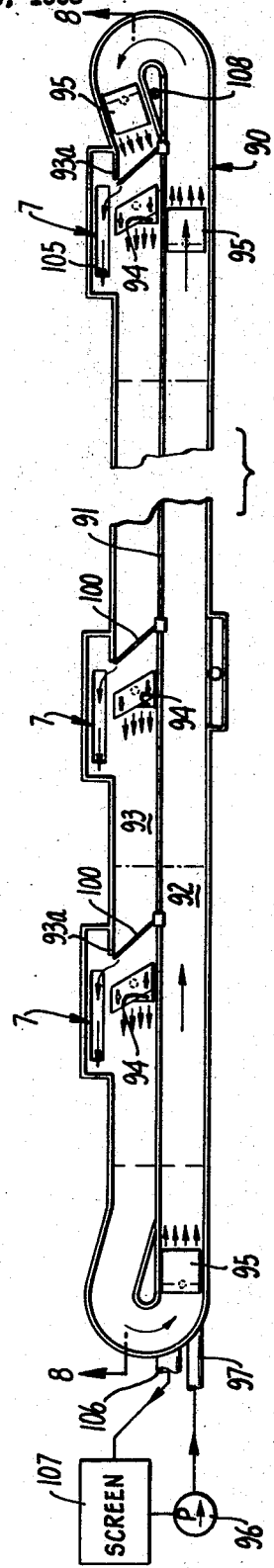
FIG. 7 is a plan view of another embodiment of this invention.
Figure 8:
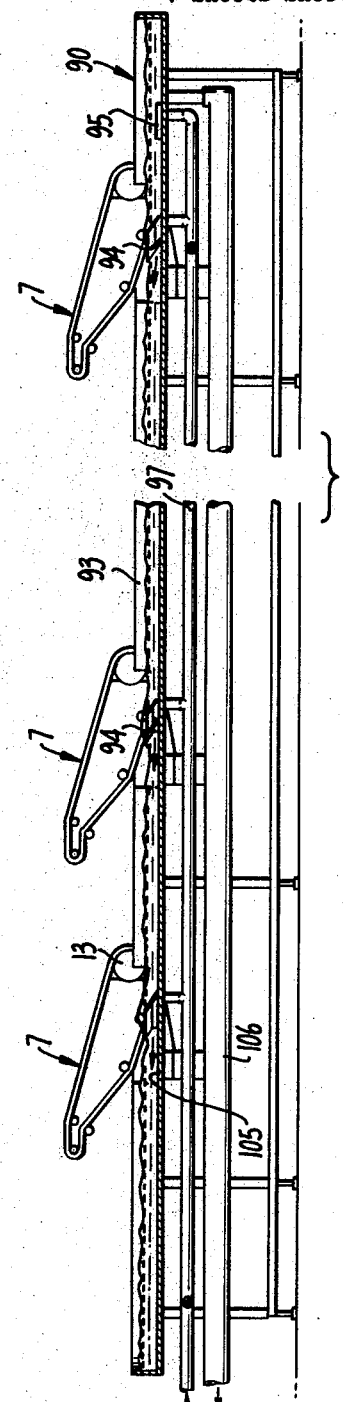
FIG. 8 is a side elevation and section taken on lines 8—8 of FIG. 7.

The width between the outer walls 58 and 59 and the center wall or divider 57 must be sufficient so that the fruit cannot bridge between the walls and stop the movement of fruit. In general, this minimum width should be about three diameters of the largest fruit to be conveyed. It will be apparent that under such conditions, and since the velocity of the liquid and fruit approximately matches the speed of the lugs on conveyor 7, more fruit may be moved past the feed portion of the single conveyor 7 than it can handle. Thus, it is possible to extend the trough 8 to several times the length required for one machine and feed several conveyor units from one trough system. A system of this type is shown in FIGS. 7 and 8 in connection with another embodiment of this invention which is described below. It is also contemplated that additional jets may be added as required throughout the length of the trough to keep the fruit and liquid in motion. Such a feature is illustrated in FIG. 5 by the use of jets 63 and 64.

Referring again to FIG. 1, each end of trough 8 is formed on a curve to which side walls 58 and 59 are essentially tangential. Unless some means is provided to guide the liquid around the ends of the trough, cavitation will occur in the region indicated at reference number 61 near the ends of divider 57. This is because the moving liquid is incapable of executing an almost instantaneous 180° turn. Baffle 62 is provided, therefore, and this device serves to turn a portion of the water from the outside of the channels and direct the liquid into the cavitation areas so that there will be less turbulence and a smoother flow of liquid after the water makes a full 180° turn. When space is not a consideration, longer sweep turns may be used at the end of the trough, as by the larger end curves 66 and 67 shown in FIGS. 5 and 6.

Figure 5:
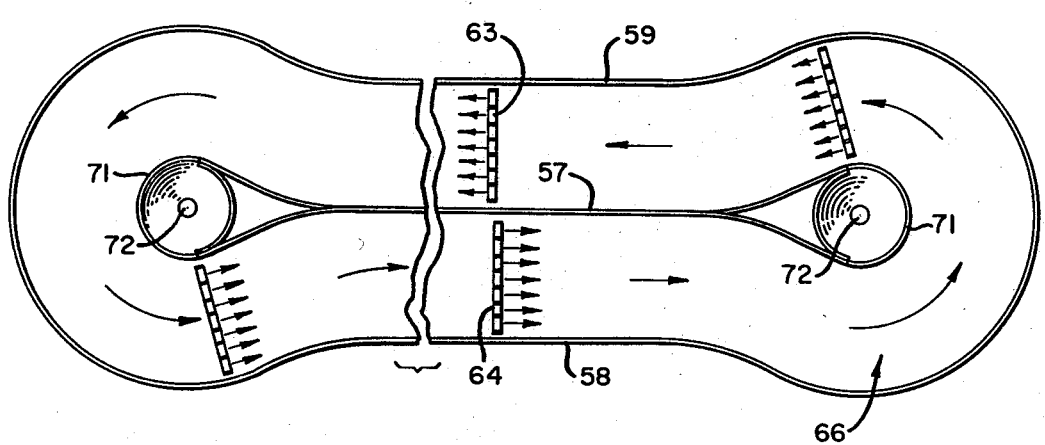
FIGS. 5 and 6 are each plan views of liquid conveyors providing different forms of troghs for handling the fruit.
Figure 6:
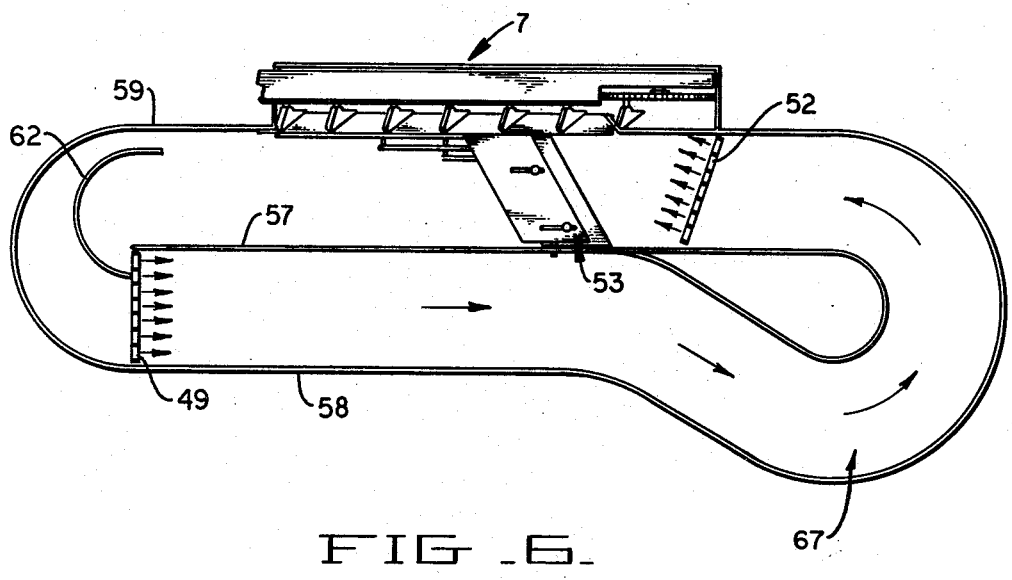

The recirculating trough illustrated in FIG. 5 illustrates a further modification where the level of the liquid in the trough is maintained relatively constant by overflow gates 71, an excess of liquid spilling over the gates into a pipe system 72 which collects the liquid and returns it to the low pressure side of the recirculating pump. In troughs of great length, additional overflow points can be provided in the exterior walls 58 and 59.

FIGS. 7 through 15 illustrate another embodiment of the invention in apparatus for feeding fruit, such as apples, into the pickup station of a conveyor 7. Referring to FIG. 7 in particular, there is shown a continuous trough 90 having a central barrier 91 that divides the trough into a pair of essentially parallel legs 92 and 93. Trough 90 contains water that is constantly circulated in a counterclockwise direction as shown, a plurality of jet means comprised of baffle supporting devices 94 and other devices 95 being used to introduce water under pressure into the trough. Devices 94 and 95 are each mounted to the bottom of the trough, an opening in each device being connected to the high pressure side of a pump 96 by a conduit 97.

Trough 90 is substantially longer than the trough illustrated in FIGS. 1 and 2 so that a plurality of chain conveyors 7 may be operated along the same leg of the trough, each conveyor having its own pickup station for receiving a piece of fruit. As with the other trough structures illustrated, fruit is supplied to each conveyor 7 by the movement and recirculation of liquid in the trough.

As the fruit floats upon the liquid in leg 93, it is brought into engagement with the resilient contact comprised of an arm 100 pivotally mounted to barrier 91 and resiliently held in a position transversely of the trough by a spring member 101. Moreover, until such time that arm 100 is contacted by the fruit, spring 101 positions the end of the arm against the opposite side 93a of leg 93. In this position arm 100 is maintained at an angle relative to the movement of fluid such that any pieces of fruit moving in leg 93 must come into contact with the arm, and such pieces will be deflected laterally in the direction of the pickup station.

The resilient tension applied by spring member 101 is sufficient to retain the end of arm 100 against side 93a until one or more pieces of fruit contact the arm. More particularly, the spring tension is selected so that a single piece of fruit will move the arm away from side 93a that distance required to pass the fruit laterally into the pickup station. This insures that a single piece of fruit traveling along the trough will be deflected into the pickup station.

Figure 9:
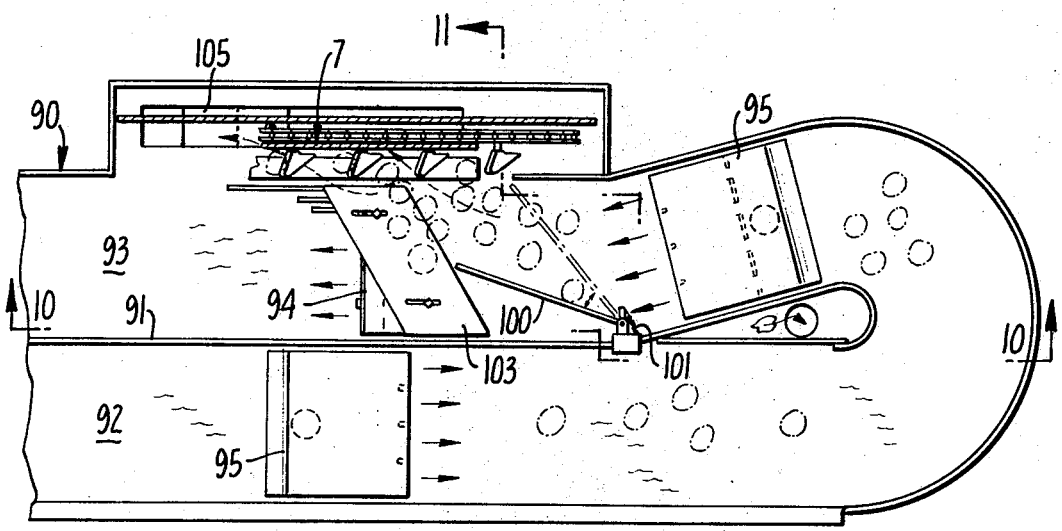
FIG. 9 is an enlarged plan view of a portion of the apparatus shown in FIG. 7.

Under those conditions where there is an over-abundance of fruit supplied in the region of the pickup station of conveyors 7, as might occur when a fresh supply of fruit has been deposited into leg 92, then arms 100 will be pivoted against the bias of spring 101, a position such as shown in FIG. 9. This, of course, allows most of the fruit to pass on without being deflected toward the pickup station. But those pieces of fruit will eventually come into contact with a baffle member 103 which in purpose and function operates the same as baffle plate 53 described in connection with the embodiment of FIGS. 1 and 2. Baffle 103 is angled across leg 93 of trough 90 in a direction that urges the fruit and liquid toward the pickup station of the associated conveyor 7 while maintaining the fluid level necessary to float the fruit and move excess fruit past the pickup station.

As with the other embodiments of this invention, trough 90 provides an exhaust port 105 in the region of the pickup station. This exhaust port communicates with the low pressure side of pump 96 through a conduit 106 and a filter screen 107. Thus, the water on the upstream side of each baffle member 103 is partly withdrawn through opening 105, thereby moving the fruit pieces into the pickup station of conveyor 7.

It will be noted that the jet devices 94 which support baffle members 103 discharge liquid under pressure to replenish the liquid on the downstream side of the pickup station. The amount of fluid introduced through each of the devices 94 is preferably in an amount equal to the volume of liquid withdrawn through exhaust port 105. Accordingly, the level of the fruit in leg 93 of trough 90 will be maintained so that excess pieces of fruit carried past the pickup station will be buoyantly supported for recirculation. In addition, the jet stream discharged from devices 94 produces a rapid movement of the carrier liquid, and particularly in the area in back of baffle member 103. This causes excess fruit to be moved more rapidly past the pickup station, thereby avoiding hangups or overloading in the pickup station.

Figure 10:
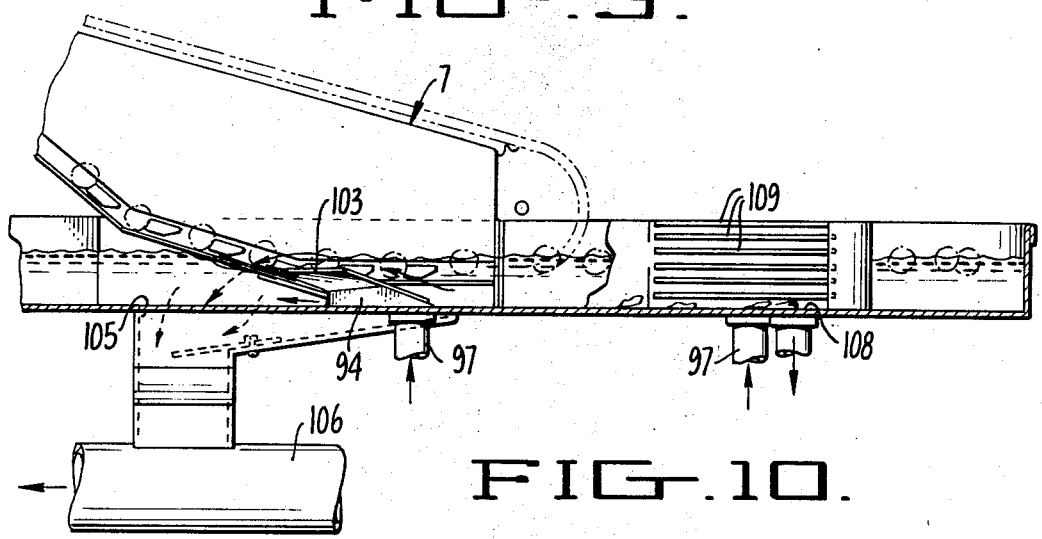
FIG. 10 is a partial section and elevation taken on lines 10—10 of FIG. 9.
Figure 11:
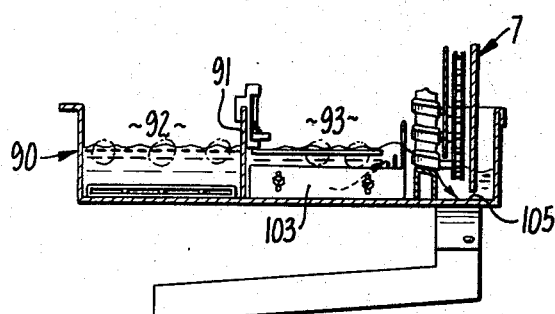
FIG. 11 is a section taken on lines 11—11 of FIG. 9.

The embodiment of the invention illustrated in FIGS. 7 through 10 further provides an opening 108 in trough 90 through which refuse, such as leaves and other garbage, may be removed. Opening 108 is preferably located intermediate the first pickup station and the downstream end of leg 92 into which fruit is deposited in bulk, and it communicates with the low pressure side of pump means 96 through conduit 106 and screen 107. Referring to FIG. 10, it will be seen that opening 108 is disposed centrally of the end curvature of trough 90, a plurality of rod members 109 guarding entrance to the opening and preventing entry of the fruit pieces.

Figure 12:
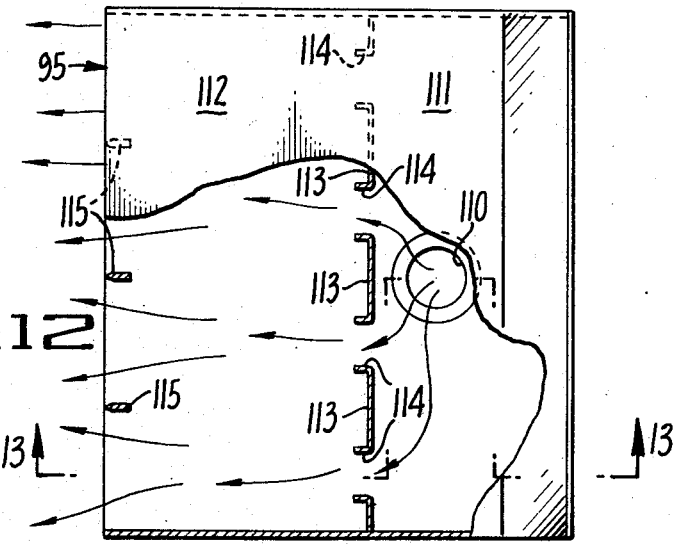
FIG. 12 is an enlarged plan view of one means for introducing water into the trough as shown in FIG. 7.
Figure 13:
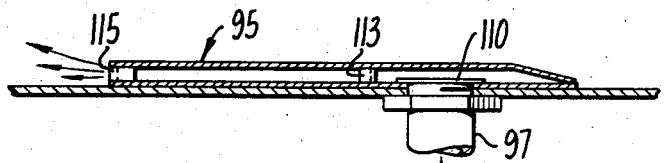
FIG. 13 is a vertical section taken on the lines 13—13 of FIG. 12.

Referring to FIGS. 12 and 13, each jet device 95 is preferably constructed to diffuse the water emitted through an opening 110 connected to high pressure conduit 97. More particularly, devices 95 essentially define a pair of plenum chambers 111 and 112 separated by a plurality of spaced barriers 113. With this construction, water will be emitted through opening 110 first into plenum chamber 111 and then past baffles 113 into chamber 112. Baffles 113 serve to apply a back pressure, equalizing the water pressure in plenum chamber 111 so that an equal amount of water will be ejected through openings 114 of approximately equal cross-sectional areas into chamber 112. A plurality of guide vanes 115 at the discharge end of plenum chamber 112 are also used to diffuse and direct the movement of liquid discharged from devices 95.

Figure 14:
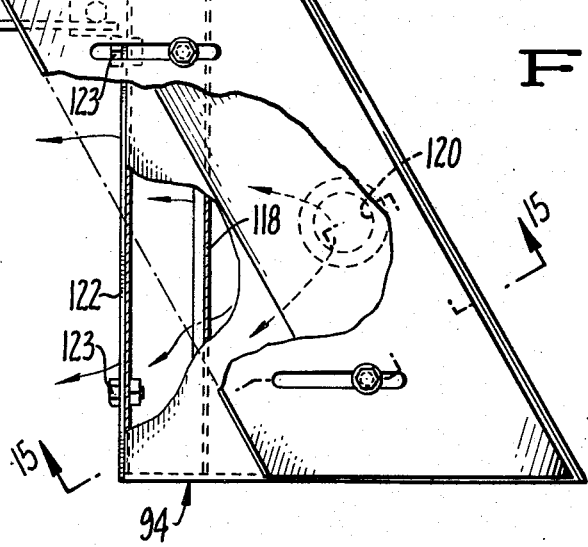
FIG. 14 is an enlarged plan view of one baffle and other means for introducing water into the trough as shown in FIG. 7.
Figure 15:
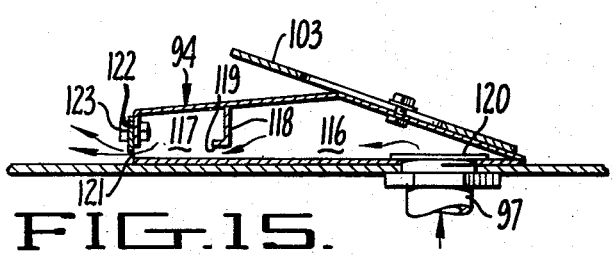
FIG. 15 is a section taken on lines 15—15 of FIG. 14.

FIGS. 14 and 15 illustrate a preferred construction of jet devices 94. Each of these devices, like devices 95, is comprised of a pair of plenum chambers 116 and 117 separated by a depending wall 118 but fluidly connected through a slotted opening 119. Plenum chamber 116 communicates with the high pressure conduit 97 through an opening 120, the area of said opening being substantially equal to the area of the slotted opening 119. Accordingly, water entering plenum chamber 116 will be initially diffused and then passed through slotted opening 119 into chamber 117. The liquid is finally discharged through a second opening 121, the force of fluid along the entire opening being substantially equal. The size of opening may be adjusted by regulating the position of an adjustable plate 122 which is secured by bolts 123.

The present invention has proven particularly useful in the feeding of apples. However, it is also useful in the feeding of other fruits or vegetables, such as pears or tomatoes. It has been found that water suffices as the liquid for conveying apples, but with other and somewhat heavier fruits or vegetables, it may be desirable to increase the density of the water as by adding common salt or sodium carbonate.

Although preferred embodiments of the invention have been illustrated and described, various modifications and changes may be resorted to without departing from the spirit of the invention or the scope of the appended claims.

What is claimed is:

1. An apparatus for feeding fruit from a bulk supply into a pickup station, comprising:
   (a) a trough for holding liquid in which pieces of fruit may be made to float;
   (b) means separating the trough to provide a continuous horizontal track including a pair of fluidly connected substantially parallel legs, one leg being adapted to receive fruit in bulk;
   (c) a conveyor extending along and substantially parallel to a side portion of the other leg of said trough and having a series of spaced pockets for receiving a piece of fruit at a pickup station within said trough as a pocket is moved through said pickup station;
   (d) a pump means for discharging liquid under pressure into said trough to produce a continuous circulation of liquid and fruit through both legs of said trough; and
   (e) means fluidly communicating the low pressure side of said pump means with an opening into said trough, said opening being located in the region of said pickup station for withdrawing liquid and producing a movement of fruit transversely of said other leg and into the pickup station.

2. Apparatus as in claim 1, and further comprising a submerged baffle means mounted in the trough for laterally deflecting fruit toward said pickup station.

3. Apparatus of claim 2, said trough having an opening on the downstream side of said baffle means, and means fluidly connecting said opening with the high pressure side of said pump means for replenishing liquid on the downstream side of said pickup station in an amount approximately equal to the volume of liquid withdrawn through the opening in the region of said pickup station.

4. Apparatus of claim 2, and further comprising a resilient contact mounted to one side of said trough on the side opposite from said pickup station, said contact extending transversely of said trough and positioned to be engaged by fruit floating in the liquid carried by said trough at a point adjacent to but upstream from said baffle means.

5. Apparatus as in claim 1, said trough having an opening intermediate said pickup station and the downstream end of said one leg into which fruit is deposited in bulk, and conduit means for removing refuse, said means fluidly connecting said opening with the low pressure side of said pump means.

6. Apparatus as in claim 1, and further comprising jet means in said other leg of the trough for discharging liquid from the pump means toward the conveyor and for moving liquid and fruit toward the pickup station.

7. An apparatus for feeding fruit from a bulk supply into a pickup station, comprising:
 (a) a trough for holding liquid in which pieces of fruit may be made to float;
 (b) means separating the trough to provide a continuous track including a pair of fluidly connected legs, one leg being adapted to receive fruit in bulk and the other leg to carry fruit past a pickup station;
 (c) a plurality of conveyors, each conveyor extending along a side portion of the other leg of said trough and having a series of spaced pockets for receiving a piece of fruit at such pickup station within said trough as a pocket is moved through said pickup station;
 (d) a pump means for discharging liquid under pressure into said trough to produce a continuous circulation of liquid through the legs of said trough;
 (e) means fluidly communicating the low pressure side of said pump means with a plurality of first openings into said trough, one of said first openings being located in the region of each pickup station for withdrawing liquid and producing a movement of fruit into the pickup stations;
 (f) a submerged baffle means mounted in the trough adjacent to each pickup station for laterally deflecting fruit toward the pickup station as the fruit is circulated in said trough; and
 (g) means fluidly communicating the high pressure side of said pump means with second openings into said trough, at least one second opening being located on the downstream side of each baffle means for replenishing liquid on the downstream side of the pickup stations in an amount approximately equal to the volume of liquid withdrawn through the plurality of first openings.

8. Apparatus for feeding fruit from a bulk supply to a pickup station, comprising:
 (a) a continuous trough for holding liquid in which pieces of fruit float over the entire length of the trough;
 (b) means separating the trough to provide a continuous track including a pair of fluidly connected legs, one leg being adapted to receive fruit and the other leg to carry the fruit past a fruit pickup station whereat fruit is removed from such leg;
 (c) a conveyor extending along a side portion of the other leg of said trough and having a series of spaced pockets for receiving a fruit in each pocket at such pickup station within said trough as a pocket on said conveyor is moved past said pickup station;
 (d) pump means for discharging liquid under pressure beneath the surface of liquid in said trough to produce a continuous circulation of liquid through the legs of said trough and past the pickup station; and
 (e) means fluidly communicating the low pressure side of said pump means with an opening into said trough, said opening being located in the region of said pickup station on that side of the conveyor which is spaced from the trough for withdrawing liquid from the trough through the conveyor to produce a movement of fruit transversely of said other leg into the pickup station.

9. Apparatus as in claim 8 wherein liquid is discharged from the pump means through a plurality of jets submerged in the liquid in the trough, the liquid so discharged through said jets causing the liquid in the trough to circulate in a continuous manner to move the fruit in the liquid from an entry point to the fruit pickup station.

References Cited

UNITED STATES PATENTS

| 2,470,521 | 5/1949 | Preble | 302—14 |
| 2,824,665 | 2/1958 | Lamouria | 302—14 |
| 3,055,378 | 9/1962 | Alford | 302—14 |
| 3,269,571 | 8/1966 | McLearn et al. | 302—14 |
| 3,288,265 | 11/1966 | Smith | 302—14 |

ANDRES H. NIELSEN, Primary Examiner